United States Patent [19]

Yoshimura et al.

[11] Patent Number: 4,898,779
[45] Date of Patent: Feb. 6, 1990

[54] POWDERS OF TETRAFLUOROETHYLENE COPOLYMER AND PROCESS FOR PREPARING THE SAME

[75] Inventors: Tatsushiro Yoshimura; Nobuyuki Tomihashi, both of Takatsuki; Shuhei Simasaki, Itami, all of Japan

[73] Assignee: Daikin Industries Ltd., Osaka, Japan

[21] Appl. No.: 135,217

[22] Filed: Dec. 21, 1987

[30] Foreign Application Priority Data

Dec. 22, 1986 [JP] Japan .................................. 61-307131

[51] Int. Cl.$^4$ ......................... B32B 5/16; C08L 27/12
[52] U.S. Cl. ..................................... 428/402; 524/546; 525/199; 525/326.2; 525/326.4; 526/254; 528/481
[58] Field of Search .................. 428/402; 524/546; 525/199, 326.2, 326.4; 526/254; 528/481

[56] References Cited

U.S. PATENT DOCUMENTS

| | | | |
|---|---|---|---|
| 3,484,503 | 12/1969 | Magner et al. ...................... | 525/199 |
| 3,655,611 | 4/1972 | Mueller et al. ...................... | 526/254 |
| 3,969,435 | 7/1976 | Bailey et al. ......................... | 528/481 |
| 4,001,351 | 1/1977 | Roura .................................. | 528/481 |
| 4,105,716 | 8/1978 | Sakai et al. .......................... | 526/254 |
| 4,220,511 | 9/1980 | Derbyshire .......................... | 528/481 |
| 4,248,763 | 2/1981 | Yoshimura et al. ................. | 524/546 |
| 4,379,900 | 4/1983 | Sulzbach . | |
| 4,521,596 | 6/1985 | Yoshimura et al. ................. | 524/415 |
| 4,552,925 | 11/1985 | Nakagawa et al. .................. | 525/200 |
| 4,675,380 | 6/1987 | Buckmaster et al. ............ | 525/326.2 |
| 4,687,708 | 8/1987 | Batzar . | |
| 4,714,756 | 12/1987 | Buckmaster et al. ............... | 528/481 |
| 4,742,122 | 5/1988 | Buckmaster et al. ............ | 525/326.4 |
| 4,743,658 | 5/1988 | Imbalzano et al. .............. | 525/326.2 |

FOREIGN PATENT DOCUMENTS

| | | |
|---|---|---|
| 041687 | 12/1981 | European Pat. Off. . |
| 0088414 | 9/1983 | European Pat. Off. ............ 526/254 |
| 196903 | 10/1986 | European Pat. Off. . |
| 0220910 | 10/1986 | European Pat. Off. . |
| 2175591 A | 12/1986 | United Kingdom . |

Primary Examiner—George F. Lesmes
Assistant Examiner—D. R. Zirker
Attorney, Agent, or Firm—Armstrong, Nikaido Marmelstein, Kubovcik & Murray

[57] ABSTRACT

Powders of tetrafluoroethylene copolymer having a non-spherical particle shape, a frictional packing ratio of 20 to 100% and an average particle size of 5 to 500 μm. The powders are useful for powder coatings, particularly roto-moulding, roto-lining and electrostatic coating.

1 Claim, 1 Drawing Sheet

POWDERS OF TETRAFLUOROETHYLENE COPOLYMER AND PROCESS FOR PREPARING THE SAME

BACKGROUND

The present invention relates to powders of tetrafluoroethylene (TFE) copolymer useful for powder coating, and a process for preparing the same.

Study and development for powders of TFE copolymer used for powder coating have proceeded on the basis of the theory that such powders preferably have a spherical particle shape in a viewpoint of flowability (Japanese Tokkyo Kokai No. 240713/1985).

To roto-molding or roto-lining which has been recently utilized as a method of powder coatings, however, the above theory could not be fully applied. For instance, there are some problems such that a coating formed on a mold surface partially falls off to yield coating defects on a surface of the molded article, that a coating surface largely undulates and has continuous ball-like projections, and that a coating contains bubbles or cells because its gas content cannot be sufficiently removed.

As a result of the inventors' intensive study, it has been found out that the above-mentioned problems can be solved by using powders of TFE copolymer having particular powder properties.

SUMMARY OF THE INVENTION

According to the present invention, there can be provided powders of TFE copolymer having a non-spherical particle shape, a frictional packing ratio of 20 to 100%, and an average particle size of 5 to 500 μm.

DETAILED DESCRIPTION

Figure 1:
FIG. 1 is a scanning-type electron microscope photograph (100 magnitudes) of a powder prepared in Preparation Example 4.

In the present invention, the powders should have a non-spherical particle shape. This property is important for obtaining an appropriate friction in the powder coating step, as explained hereinbelow.

Film forming operation of the roto-molding and roto-lining is carried out by externally heating a mold charged with a powder in such an amount to give a desired thickness while rotating the mold biaxially or uniaxially. In the course of the film formation, the powder is heated by contacting with the inner surface of the heated mold, and gradually adheres onto the mold surface to form a molten thin film, from which air present between the powder particles is released by itself. The adhesion and melting of the remaining heated powder is gradually and continuously effected to produce a film having a desired thickness without bubbles or cells. For performing such a good film formation, it is necessary to contact a powder with a heated mold surface for an appropriate period of time. Namely, when the contacting time is shorter, an adherent powder partially falls off from a mold surface, or on the contrary a powder is wholly and homogeneously heated, and then the homogeneously heated powder wholely adheres onto the mold surface and is melted for a very short time to form a film without releasing bubbles.

Such an appropriate contacting time cannot be obtained by using spherical particles, but can be obtained by using non-spherical particles which have a large friction. The word "non-spherical shape" as used in the specification means a shape having at least a linear profile when a particle is cut along an optional line, even if the remaining profile is round. The sectional profile should not be a smooth circle.

The frictional packing ratio of the powder of the invention defined by the following equation (I) must be within a range from 20 to 100%.

$$\text{Frictional Packing Ratio (\%)} = \left( \frac{\rho_2}{\rho_1} - 1 \right) \times 100 \quad (I)$$

wherein $\rho_1$: bulk density of powder measured according to JIS K 6891

$\rho_2$: bulk density of packed powder measured according to JIS K 6891. Packing operation is as follows: a 100 ml SUS container (diameter: 40 mm, height: 79.6 mm) is charged with a powder, and the container is vibrated by touching a vibrator (Panabrator EV234 available from Matsushita Electric Industrial Co., Ltd.) on a central side portion of the container for one minute. This vibration operation is repeated by adding a powder to the container until the reducing volume becomes lower than 5% by volume of the container. Finally the container is filled with an additional powder, and then the bulk density of the packed powder is measured.

This frictional packing ratio shows the degrees of both friction and packing density of the powder. A small value means a low friction of a powder, and a large value means a high friction of a powder.

A frictional packing ratio of the powder according to the invention is 20 to 100%. When the ratio is less than 20%, the above-mentioned problems cannot be solved due to its low friction. A TFE copolymer powder having a spherical shape generally has a frictional packing ratio of 5 to 15%. When more than 100%, a uniform coating cannot be obtained due to its high friction.

An average particle size of the powder according to the invention is 5 to 500 μm. In case of a powder for roto-molding and roto-lining, the powder preferably has an average particle size of 100 to 150 μm, and in case for electrostatic powder coating the powder preferably has an average particle size of 5 to 150 μm.

Average particle sizes of powders are measured according to ASTM D-1457-69. Sieves of 16 to 400 mesh are provided on the basis of wet sieve method. Among them, by using five sieves so that a sieve having a pore opening size almost the same as an expected average particle size of a powder to be measured is a central sieve, the powder is sieved. The average particle size is determined by using a logarithm probability paper described in the ASTM on the basis of relationship between the cumulative residual percentage and pore opening size of the sieve. A powder having an average particle size of not more than 400 mesh (not more than 33 μm) is measured as follows: a beaker of 100 ml is charged with 50 ml of Daifloil S-519 (chlorotrifluoroethylene telomer oil available from Daikin Industries, Ltd.), and 0.1 g of a powder to be measured is added thereto. After dispersing the powder with a supersonic dispersing apparatus for one minute, a sample is introduced to a spectral cell, and then the average particle size is measured by centrifugal transmittance method with CAPA-500 manufactured by HORIBA, LTD.

Particle size distribution as well as particle shape influences the packing density of powder. For instance, when a particle size distribution is wide, the amount of air between particles can be reduced because the packing state becomes near closest packing. However, even in such a case, it is necessary to regulate the frictional packing ratio within the above-mentioned range.

The powder having a preferable flowability satisfies the following equation (II):

$$\log \mu < 2.45 \rho_1 + 0.75$$

wherein:

$\mu$: average particle size $\rho_1$: bulk density as defined in the equation (I).

The TFE copolymer used in the invention is a TFE/hexafluoropropylene copolymer or a TFE/fluoro(vinyl ether) copolymer. Each of the copolymers preferably contains TFE unit in an amount of 85 to 99.5% by mole. Preferred fluoro(vinyl ether) is a compound of the formula:

$$CF_2=CF(OCF_2CF(CF_3)mO(CF_2)nCF_2X$$

wherein X is hydrogen atom or fluorine atom, m is 0 or an interger of 1 to 4, n is 0 or an integer of 1 to 7. Examples of the fluoro(vinyl ether) are, for instance, perfluoro(methyl vinyl ether), perfluoro(ethyl vinyl ether), perfluoro(propyl vinyl ether), $CF_2=CFOCF_2CF(CF_3)OCF_2CF_3$,
$CF_2=CFOCF_2CF(CF_3)O(CF_2)_2CF_3$,
$CF_2=CFOCF_2CF(CF_3)O(CF_2)_3CF_3$,
$CF_2=CF(OCF_2CF(CF_3))_2OCF_2CF_3$,
$CF_2=CF(OCF_2CF(CF_3))_2O(CF_2)_2CF_3$,
$CF_2=CF(OCF_2CF(CF_3))_2O(CF_2)_3CF_3$, or the like.

A TFE/fluoro(vinyl ether) copolymer can be prepared, for example, by dispersion polymerization described in Japanese Tokkyo Kokai No. 189210/1983, or by emulsion polymerization described in Japanese Tokkyo Kokoku No. 20788/1983.

The powder of the present invention can be prepared by producing a sheet with rolls from a TFE copolymer raw powder, and then pulverizing the sheet.

As the raw powder of TFE copolymer used in the process of the invention, there may be employed a dry powder prepared by dispersion polymerization described in Japanese Tokkyo Kokai No. 189210/1983 or prepared by emulsion polymerization described in Japanese Tokkyo Kokoku No. 20788/1973. Since a dry powder prepared by emulsion polymerization contains an emulsifier or a coagulant, a dry powder prepared by dispersion polymerization is preferred in view of contaminant. Production of a sheet with rolls is operative so that a sheet has a thickness of 0.05 to 5 mm, preferably 0.1 to 3 mm.

The roll used in the present invention comprises two or more rolls which are arranged in perpendicular, inverted L, or Z position. Examples are, for instance, a calender roll, mixing roll or the like. It is preferable to regulate the roll distance, rotation speed, pressure, temperature and the like. According to this method, since a large slide shearing force is applied to the copolymer, bubbles and cells in the copolymer can be released out of the copolymer to give a uniform and homogeneous sheet. The sheet produced by the method is uniform both in the surface and inner regions in comparison with a sheet produced by other press methods as described in U.S. Pat. No. 4,312,961, and can give the powder which satisfies the powder properties of the invention by the subsequent pulverizing step. The main defect of the press method is contamination of the TFE copolymer by a small amount of metal powder which is yielded due to abrasion between the metal molds at the pressing operation. This contaminated TFE copolymer cannot be used for coatings or containers utilized in the semiconductor industry because contamination gives serious damages to semiconductors. In addition, since release of bubbles or cells in the raw powder particles requires a very high pressure according to the press method, a special equipment is needed.

As operation conditions for production of sheet, there is preferably employed such conditions that an operation temperature is 0° to 250° C., particularly 30° to 200° C., and the resulting sheet is transparent or translucent.

The thickness of the sheet is preferably 0.05 to 5 mm. When more than 5 mm a uniform sheet is hard to obtain because the shearing force to the outer surface portion is different from that to the inner portion. A sheet thinner than 0.05 mm has a problem of productivity. The pulverizing step is carried out by applying impact force, shearing force and compression force to the sheet with machines such as a cutter mill, hammer mill or jet mill. Operation temperature is generally −200° to 100° C.

Thermal stability of TFE copolymers can be improved by known methods disclosed in Japanese Tokkyo Kokoku No. 23245/1971. Those methods may be employed in the present invention. A preferred thermal stabilization method to be applied to the invention is fluorine gas treatment, which can be applied either to the copolymer obtained from the sheet production step or the copolymer obtained from the pulverizing step. As conditions of the fluorine gas treatment, there may be employed a fluorine gas concentration of 5 to 30% by volume (the other gas being an inert gas such as nitrogen gas), a pressure of 0 to 10 kgf/cm²G, and a reaction temperature of 50° to 250° C.

Thermal stability ratio of a copolymer is calculated according to the equation (III):

$$\text{Thermal Stability Ratio (\%)} = \left(1 - \frac{MI(b)}{MI(a)}\right) \times 100 \quad \text{(III)}$$

wherein

MI(a): melt index of a sample without heat treatment measured at 372° C. according to ASTM D-2166

MI(b): melt index of an sample which is subjected to heat treatment at 380° C. for 5 hours.

The fluorine gas treatment is preferably carried out until the thermal stability ratio becomes 20% or lower.

The TFE copolymer powder of the present invention is suitably used as materials for molded articles such as pipes, parts, lining container or tank utilized for production of semiconductors which are seriously impaired by contamination. Also the powder can be utilized for usual corrosion resistive lining, roto-molding (e.g. for containers), roto-lining (e.g. for inner lining of pipes or joints) or the like. Those articles can be produced by various processing methods such as electrostatic powder coating method, fluidized dip coating method, roto-molding method and roto-lining method.

The present invention is more specifically described and explained by means of the following Examples. It is to be understood that the present invention is not limited to the Examples and various changes and modifications may be made in the invention without departing from the spirit and scope thereof.

PREPARATION EXAMPLE 1

A dry powder of TFE/perfluoro(propyl vinyl ether) copolymer (98.5/1.5 molar ratio) was prepared according to the dispersion polymerization described in Japanese Tokkyo Kokai No. 189210/1983. From the dry powder (bulk density: 0.57 g/cc, average particle size: 400 to 600 μm), a translucent sheet having a thickness of 1 mm was produced by using special compression rolls (Roller Compactor "MINI" manufactured by Freund Industries, Co., Ltd.) under the following conditions: a roll rotation speed of 10 rpm, a feeder rotation speed of 20 rpm, a compression gauge pressure of 150 kg/cm$^2$G and a roll surface temperature of 50° C.

The sheet was pulverized by using an atomizer (manufactured by Fuji Paudal Co., Ltd.) under the following conditions: a rotation speed of 1300 rpm, and a pore opening size of screen of 1.5 mm.

The resulting powder was sieved with a sieve of 35 mesh to give a non-spherical TFE copolymer powder having a frictional packing ratio of 35.5%, a bulk density ($\rho_1$) of 0.92 g/cc, an average particle size of 205 μm, and a thermal stability ratio of 75%.

PREPARATION EXAMPLE 2

A translucent sheet having a thickness of 1 mm was produced according to the same procedures and by using the same TFE copolymer as in Preparation Example 1, and then was pulverized with an atomizer (manufactured by Fuji Paudal Co., Ltd.) under the following conditions: a rotation speed of 3900 rpm and a pore opening size of screen of 0.5 mm.

The resulting powder was sieved with a sieve of 60 mesh to give a non-spherical TFE copolymer powder having a frictional packing ratio of 60.0%, a bulk density ($\rho_1$) of 0.55 g/cc, an average particle size of 40 μm, and a thermal stability ratio of 72.5%.

PREPARATION EXAMPLE 3

A dry powder (bulk density: 0.48 g/cc, average particle size: 400 to 800 μm) of TFE/hexafluoropropylene copolymer (92/8 molar ratio) was prepared by dispersion polymerization. From the dry powder a translucent sheet having a thickness of 1.5 mm was produced by using special compression rolls (Roller Compactor "MINI" manufactured by Freund Industries, Co., Ltd.) under the following conditions: a roll rotation speed of 10 rpm, a feeder rotation speed of 20 rpm, a compression gauge pressure of 150 kg/cm$^2$G and a roll surface temperature of 80° C.

The sheet was pulverized by using an atomizer (manufactured by Fuji Paudal Co., Ltd.) under the following conditions: a rotation speed of 1300 rpm, and a pore opening size of screen of 1.5 mm.

The resulting powder was sieved with a sieve of 35 mesh to give a non-spherical TFE copolymer powder having a frictional packing ratio of 40.2%, a bulk density ($\rho_1$) of 0.90 g/cc, an average particle size of 185 μm, and a thermal stability ratio of 120.5%.

PREPARATION EXAMPLE 4

A cylindrical container of monel (inner diameter: 200 mm, height: 600 mm) having a heater wound therearound and also having a set of disc-like pans (outer diameter: 185 mm, height: 20 mm, 12 stages) arranged in the center of the container by means of a guide was used for fluorine gas treatment. Each pan was charged with 100 g of the TFE copolymer powder prepared in Preparation Example 1. After installing the set of pans in the container, the container was washed with nitrogen gas to remove oxygen gas, and then heated to 250° C. Subsequently, a fluorine gas diluted with nitrogen gas (fluorine gas content: 10% by volume) was introduced to the container and maintained for 120 minutes. After cooling, nitrogen gas was exhausted to obtain a thermally stabilized powder having a thermal stability ratio of 2%. As a result of observing the powder by means of scanning type electron microscopy, the powder particle was non-spherical. The electron microscopic photograph (magnification: 100) is shown in FIG. 1.

PREPARATION EXAMPLE 5

The TFE copolymer powder prepared in Preparation Example 1 was subject to the same fluorine gas treatment as in Preparation Example 4 except that the treatment was carried out at 200° C. for 120 minutes by using a fluorine gas (fluorine gas content: 10% by volume) to give a powder having a thermal stability ratio of 5%.

PREPARATION EXAMPLE 6

The TFE copolymer powder prepared in Preparation Example 1 was subject to the same fluorine gas treatment as in Preparation Example 4 except that the treatment was carried out at 250° C. for 180 minutes by using a fluorine gas (fluorine gas content: 5% by volume) to give a powder having a thermal stability ratio of 11%.

PREPARATION EXAMPLE 7

The production of the sheet and pulverization in Preparation Example 1 were repeated by using the fluorine-gas-treated TFE copolymer powder prepared in Preparation Example 4 to obtain a powder. The powder was sieved with a sieve of 35 mesh to give a non-spherical TFE copolymer powder having a frictional packing ratio of 32.3%, a bulk density ($\rho_1$) of 0.95 g/cc, an average particle size of 190 μm, and a thermal stability ratio of 2%.

PREPARATION EXAMPLE 8

The TFE copolymer powder prepared in Preparation Example 2 was subjected to the same fluorine gas treatment as in Preparation Example 4 except that the treatment was carried out at 200° C. for 120 minutes by using a fluorine gas (fluorine gas content: 10% by volume) to give a powder having a thermal stability ratio of 9%.

COMPARATIVE PREPARATION EXAMPLE 1

By using the TFE copolymer raw powder used in Preparation Example 1, tablets (diameter: 11 mm, thickness: 3 mm, weight: 0.8 g) were prepared by means of an automatic molding machine under a compression gauge pressure of 700 kg/cm$^2$G.

The tablets were pulverized under the same conditions as in Preparation Example 1 and sieved to give a non-spherical TFE copolymer powder having a frictional packing ratio of 125%, a bulk density ($\rho_1$) of 0.62 g/cc, an average particle size of 233 μm, and a thermal stability ratio of 76.5%.

COMPARATIVE PREPARATION EXAMPLE 2

Tablets were prepared in the same manner as in Comparative Preparation Example 1, and then pulverized in the same manner as in Preparation Example 2 to give a non-spherical TFE copolymer powder having a frictional packing ratio of 150%, a bulk density ($\rho_1$) of 0.32 g/cc, an average particle size of 55 μm, and a thermal stability ratio of 73%.

EXAMPLES 1 TO 5 AND COMPARATIVE EXAMPLE 1

A mold of 3000 ml with a mold bumping was cleaned, and a silicone type mold-release compound was applied to the mold, and then dried. The mold was charged with 600 g of the powder prepared in Preparation Example 1, and sealed. After setting the mold to a rotomolding machine, the molding machine was heated from room temperature to 360° C. for 40 minutes while rotating biaxially at a revolution speed of 9 rpm and an autorotation speed of 23 rpm, and maintained at 360° C. for 60 minutes, following by air cooling for 30 minutes to mold a container. The outer and inner surfaces of the molded container were observed in viewpoints of appearance and foaming. The results are shown in Table 1.

The represented evaluation in Table 1 are based on the following standard.

(Appearance of outer surface)
X: Partial surface defects
O: Beautiful appearance
(Appearance of inner surface)
X: Great undulation having continuous ball-like projections
Δ: Moderate undulation
O: Good leveling property
(Foaming)
X: Many bubbles or cells
Δ: Some bubbles or cells
O: No bubble or cell

EXAMPLE 6

A container was molded in the same manner as in Example 1 except that the powder prepared in Preparation Example 8 was used and the mold was heated at 340° C. The molded container was observed to evaluate its appearance and foaming. The results are shown in Table 1.

COMPARATIVE EXAMPLE 2

A container was molded in the same manner as in Example 1 except that a spherical powder having a frictional packing ratio of 13.5%, a bulk density of 0.98 g/cc, an average particle size of 320 μm and a thermal stability ratio of 3%. The molded container was observed to evaluate its appearance and foaming. The results are shown in Table 1.

TABLE 1

| TFE Copolymer Powder | Properties of Molded Container | | |
|---|---|---|---|
| | Outer Appearance | Inner Appearance | Foaming |
| Example No. | | | |
| 1 | Prep. Ex. 1 | Δ | Δ |
| 2 | Prep. Ex. 4 | | | |
| 3 | Prep. Ex. 5 | | | |
| 4 | Prep. Ex. 6 | | | |
| 5 | Prep. Ex. 7 | | | |
| 6 | Prep. Ex. 8 | | | (Neck portion) |
| Comp. Ex. No. | | | | |
| 1 | Comp. Prep. Ex. 1 | | X | X |
| 2 | — | X | | |

EXAMPLES 7 TO 8 AND COMPARATIVE EXAMPLE 3

To the powders prepared in Preparation EXAMPLES 1 and 3 and Comparative Preparation Example 1 was added potassium hydrogen-sulfate as a melting agent. The powder was melted and decomposed in a platinum basin, and then an ash content was dissolved in deionized water to prepare a sample solution. The sample solutions were analyzed by means of atomic absorption analysis (flameless) to determine the amounts of iron, chromium and nickel present in the powders. The results are shown in Table 2.

TABLE 2

| TFE Copolymer Powder | Kind of Metal (ppm) | | |
|---|---|---|---|
| | Iron | Chromium | Nickel |
| Example No. | | | |
| 7 | Prep. Ex. 1 | 0.01 | 0.003 | 0.01 |
| 8 | Prep. Ex. 3 | 0.02 | 0.005 | 0.02 |
| Comp. Ex. No. | | | | |
| 3 | Comp. Prep. Ex. 1 | 0.5 | 0.04 | 0.3 |

As is clear from Table 2, according to the press method the powder is contaminated with metals used in the mold.

EXAMPLE 9

To a blast-treated stainless steel plate were applied two primers for fluorine resin coating (EK-1083GB and EK-1883GB, both available from Daikin Industries, Ltd.) to form a double layer primer coating, and then was baked. The primer coating was electrostatically coated with the powder prepared in Preparation Example 8 at a base plate temperature of 300° C. with the GX3300 Type electrostatic powder coating machine manufactured by Iwata Aircompressor Manufacturing, Co., Ltd., and the resulting coating was baked at 340° C.

After repeating the electrostatic powder coating operation three times one above the other while shifting the application area so that a surface of each coating could be observed, the resulting three-layer coating was baked at 340° C. for 120 minutes to obtain a sample. The appearance of each coating surface was observed and evaluated according to the following standard. The results are shown in Table 3.

X: Many bubbles or cells
Δ: Some bubbles or cells

O: No bubble or cell

COMPARATIVE EXAMPLE 4

By using the TFE copolymer powder of Comparative Preparation Example 2, the same coating and baking procedures as in Example 9 were repeated to prepare a coating, and then the appearance of the coating surfaces were observed. The results are shown in Table 3.

TABLE 3

|  | TFE Copolymer Powder | First Coating (thickness) | Second Coating (thickness) | Third Coating (thickness) |
| --- | --- | --- | --- | --- |
| Example No. | | | | |
| 9 | Prep. Ex. 8 | (500 μm) | (900 μm) | (1200 μm) |
| Comp. Ex. No. | | | | |
| 4 | Comp. Prep. Ex. 2 | (200 μm) | X (400 μm) | — |

What we claim is:

1. Powders of tetrafluoroethylene copolymer consisting essentially of particles of a copolymer selected from the group consisting of a tetrafluoroethylene/hexafluoropropylene copolymer and a tetrafluoroethylene/fluoro (vinyl ether) copolymer, said particles having a non-spherical shape which is characterized by a sectional profile which comprises at least one linear section, wherein the frictional packing ratio is in the range of 20 to 100%, the average particle size ($\mu$) is in the range of 100 to 500 μm, and the average particle size ($\mu$) and the bulk density ($\rho_1$) of the powders satisfy the following equation:

$$\log \mu < 2.45 \rho_1 + 0.75.$$

* * * * *